May 12, 1964 E. J. BONANNO 3,133,153
SPECIAL SERVICE TOLL TELEPHONE SYSTEM
Filed Oct. 7, 1960 3 Sheets-Sheet 1

INVENTOR.
Ernest J. Bonanno
BY C. A. Gulbrandsen
Atty.

May 12, 1964 E. J. BONANNO 3,133,153

SPECIAL SERVICE TOLL TELEPHONE SYSTEM

Filed Oct. 7, 1960 3 Sheets-Sheet 2

INVENTOR.
Ernest J. Bonanno

BY C. A. Gullbrandsen
Atty.

INVENTOR.
Ernest J. Bonanno
BY
Atty.

United States Patent Office 3,133,153

Patented May 12, 1964

3,133,153

SPECIAL SERVICE TOLL TELEPHONE SYSTEM

Ernest J. Bonanno, Roselle, Ill., assignor to Automatic Electric Laboratories, Inc., Northlake, Ill., a corporation of Delaware Filed Oct. 7, 1960, Ser. No. 61,240
7 Claims. (Cl. 179—7.1)

The present invention relates to automatic toll ticketing systems and more particularly to a system for handling person-to-person, collect and other special calls on an automatic ticketing basis.

From the time of introduction of direct distance dialing, for station-to-station sent paid messages, operating companies have wished to extend the benefit of direct distance dialing of other types of calls to further reduce operating effort and obtain automatic billing. It is obvious that only station-to-station sent-paid calls can be handled on toll ticketing facilities without operator assistance. Any other type of call if customer dialed, requires operating assistance and supervision to make sure that the call is properly handled and the subscriber has reached the correct party.

With the customer dialing the desired person's number, it would not be necessary for the operator to perform this function. The operator will not require written information nor will the operator have to prepare a toll ticket if the call is completed on the first attempt. The operator will however be brought into the connection before the call can be extended to the called station. The operator obtains the name of the desired party and remains with the call until she has the assurance that the call is answered by the proper party. The operator must then initiate the timing of the call. Once this is done the operator may remove herself from the connection and has no need to enter it again. A billing record of the call will be made automatically by the ticketing equipment. It is obvious therefore that operator time is reduced to a minimum, since the operator no longer is required to dial the called number nor is she required to prepare a toll ticket for use in billing the subscriber.

The actual procedure on a customer dialed person-to-person call would be as follows: The subscriber would first dial an access code indicated in the directory for person-to-person calls, then dial the desired partie's number. This number is recorded in the ticketing equipment and an operator is automatically brought into the connection. The operator would be advised by appropriate signaling equipment that the call to be placed is a person-to-person call, and inquires the name of the desired party. Meanwhile the ticketing equipment has forwarded the dialed number to the switching equipment at the appropriate point to signal the called party. When the called number answers, the operator on the connection will ask for the proper party at that number. If the proper person has answered the operator will initiate timing of the call by operating the switch. At this time the operator may retire from the connection. It may be noted at this time that the operator does not receive nor require the called or calling numbers for use in completing the call.

Exactly the same procedure would apply if a person-to-person collect call had been made except that the operator would depress a positional key to indicate to the ticketing equipment charging of the call on a collect basis. It should be noted that the calls thus far described, person-to-person or collect may not require the operator to write any kind of ticket if the call is completed on the first attempt.

Another class of calls that may be handled on this equipment are those calls where subscribers request time and charges. In this case the operator will remain with the call rather than retiring from the connection and supply the desired information at the completion of the call by the subscriber.

Accordingly it is the primary object of this invention to provide equipment for use in an automatic toll ticketing telephone system for person-to-person, collect and special calls to be dialed by the subscriber and providing minimum assistance by an operator for completion of the call.

A feature of this invention is an operator's position equipped to provide the necessary service for facilitating the completion and automatic billing of person-to-person, collect and special toll calls dialed by the subscriber in an automatic toll ticketing telephone system.

FIGURE 1 is a schematic block diagram of a telephone system providing facilities for person-to-person, collect and special service calls on an automatic toll ticketing basis. The system disclosed by applicant is similar to that shown in U.S. Patent 2,678,353 to J. E. Ostline issued May 11, 1954, with the equipment shown as subscriber's stations 100, 101–199, linefinder 102, first selector 103, register sender hunter 104, register sender 105, auxiliary selector 106, ticketer 107, route selector 108, outgoing trunk 109, register resender finder 110, and register resender 111 being substantially identical to the equipment shown in this patent. The link and position equipment including gate circuit 112, distributor 113, link 114, operator's position 115, finder 116, position circuit 117 and position distributor 118 are substantially identical to the equipment shown in the copending application of John E. Ostline et al. tilted Automatic Toll Ticketing Telephone System, Serial No. 650,508, filed April 3, 1957, issued July 24, 1962 as U.S. Patent 3,046,342.

Figure 2:
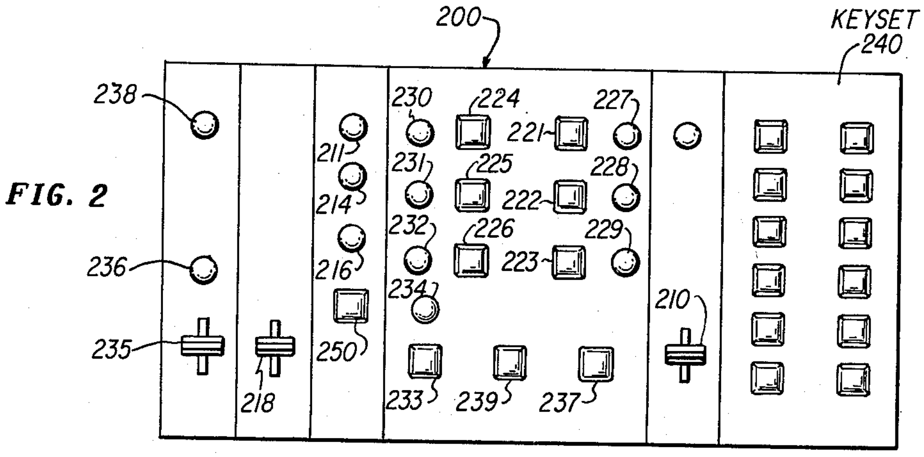
FIGURE 2 is a drawing of the key and lamp equipment provided at a switchboard position for use in a system like that shown in FIGURE 1.
Figure 4:
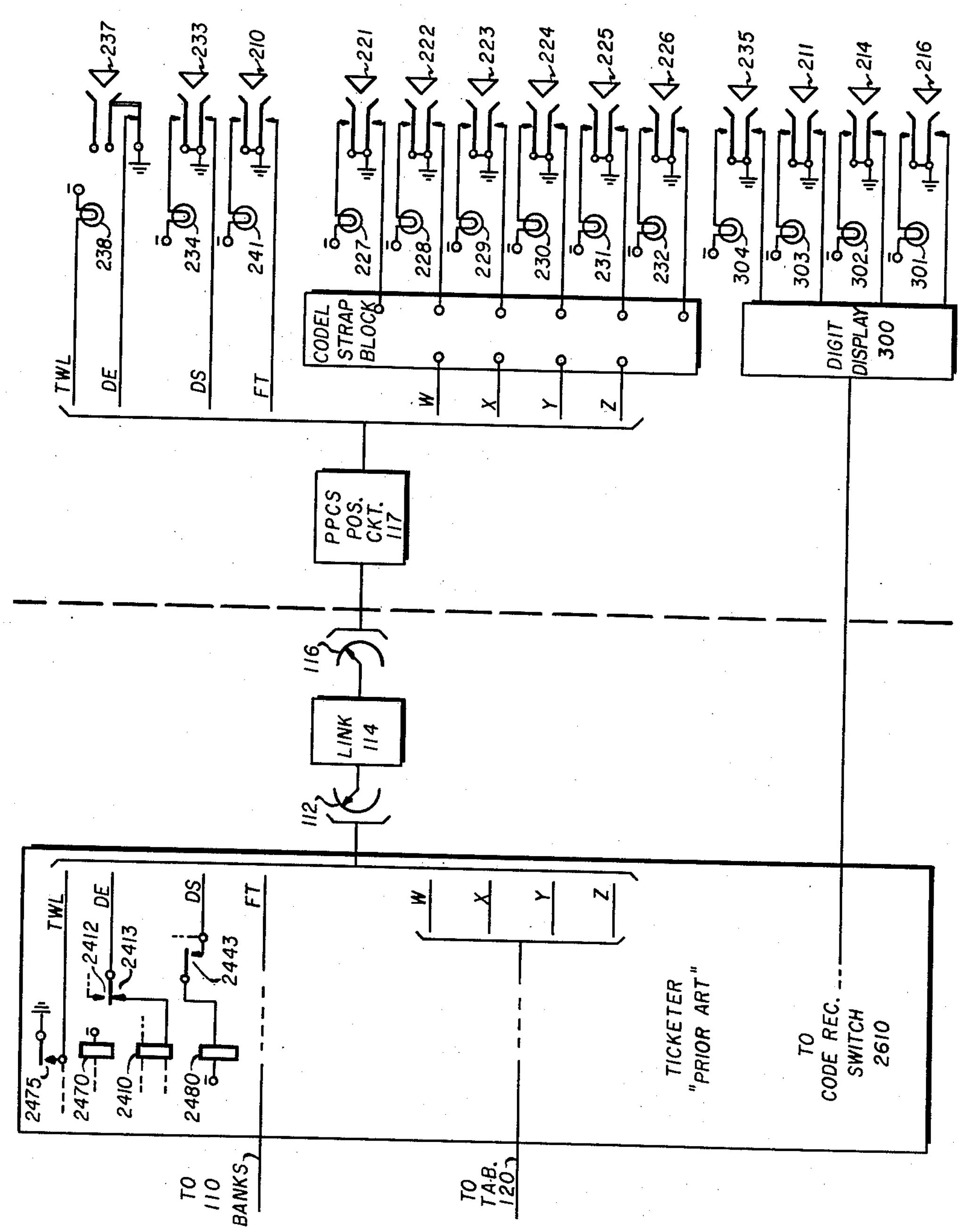
FIGURE 4 is a diagrammatic representation of the manner in which the ticketer shown in U.S. Patent 2,678,-353 can be utilized to function as the ticketer 107 shown in the present invention.

FIGURE 4 is also a diagrammatic representation of the lamp and key equipment shown in FIG. 2 and referred to in the specification. This equipment permits the use of an operator's position like that shown in U.S. Patent 3,046,342 to be utilized as the operator's position 115 shown in the present invention.

Inasmuch as the equipment disclosed here was intended principally for person-to-person as well as collect and special service calls it will be referred to as PPCS. This abbreviation will be used hereafter with reference to this type of service.

Figure 1:
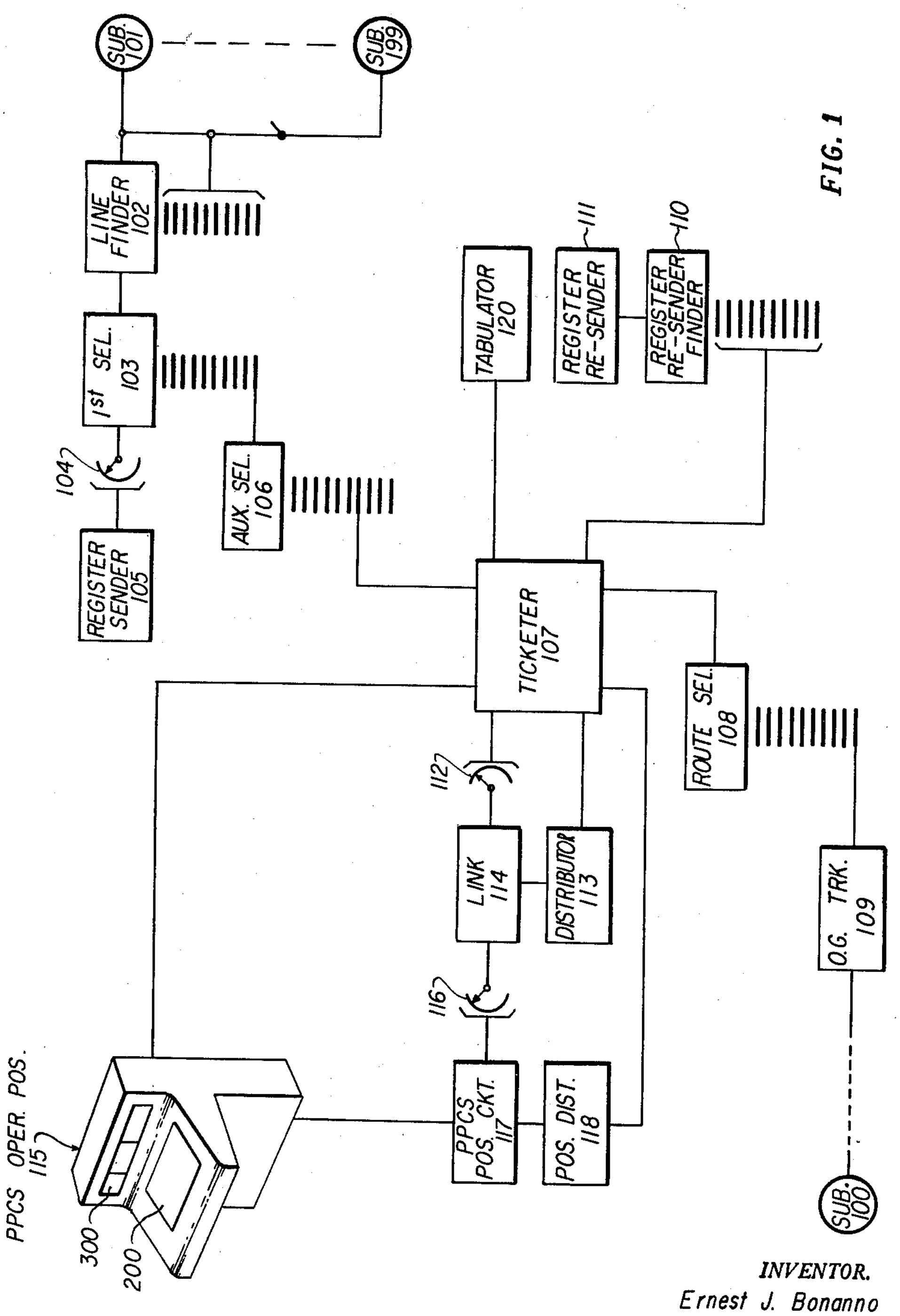

Referring to FIG. 1 if a subscriber wishing to place a PPCS call from a regular subscriber station 101 he designates this by first operating his calling device to dial the digit "0" and then dialing the desired number. The first digit of the called number must be dialed within 4 to 6 seconds after the "0" or the call would be interpreted as a call to the toll operator and routed accordingly.

The call is extended by way of line finder 102, first selector 103 and register sender hunter 104 to register sender 105. When the register sender receives "0" plus the called number, it makes note that this is to be a PPCS call and continues to serve the call in the same manner as a station-to-station call up to the point of out pulsing. The outpulsing is different in that the PPCS call is routed to a level on auxiliary selector 106. The call is further extended over the bank contacts to the selected level of auxiliary selector 106 to ticketer 107, seizing ticketer 107 and route selector 108. Register sender 105 then extends ticketing information in to the ticketer and then forwarding the additional routing digit into the route selector to access an outgoing trunk 109. The outgoing trunk 109 extends to a distant office.

When the outgoing trunk circuit 109 is seized a stop dial signal is returned to the register sender 105 over a path to the route selector 108, ticketer 107, auxiliary selector 106, first selector 103 and register sender hunter 104, the outgoing trunk 109 is marked busy to other selectors but does not seize forward at this time. Ticketer 107 calls for a register resender through register sender finder 110. Then the register resender 111 is connected to the ticketer 107. The ticketer connects one side of the line through the register sender to the register resender 111 which removes the stop dial. The register sender 105 then continues to spill the remaining routing digits to the register resender 111.

When the register sender 105 has spilled all routing digits to the register resender 111 and all of the ticketing information to the ticketer 107, the register sender 105 sends a mark to the ticketer 107 and releases. The ticketer now places a marking on the appropriate bank contact with rotary switch 112 used as a gate circuit to the PPCS links 114. The ticketer 107 extends control through link distributor 113 to link circuit 114 to cause the gate circuit 112 to operate to close through a circuit connection to the ticketer 107. The ticketer 107 then provides a ground on a call waiting lead to the operators position 115 until an operator is connected.

The distribution scheme between the PPCS ticketer 107 and the operator is similar to that used in automatic toll ticketing systems. The number of links provided between the two points is based on traffic requirements. The PPCS operators position 115 when staffed has an accept key thrown to mark it idle to the link 114. When a position is seized by a position finder 116 an order tone is given to the operator and to the calling subscriber if desired. A common multiple is closed between the ticketer 107 and the position circuit 117, over which is passed the called number, calling number and ticketer number to position storage equipment included in position circuit 117.

When the ticketer 107 is notified that a PPCS position 115 is connected, the register resender 111 is signaled to seize forward and start out pulsing the called number. When the register resender 111 has completed its functions it signals the ticketer 107 and releases. The ticketer closes the talking conductors assigned to the operator and calling party. The operator is then given called party supervision.

The transfer of information from the ticketer 107 to the operator at position 115 takes approximately 50 milliseconds. When the transfer is completed the position distributor 118 is advanced to allot the next position to a waiting or hunting link.

Figure 3:
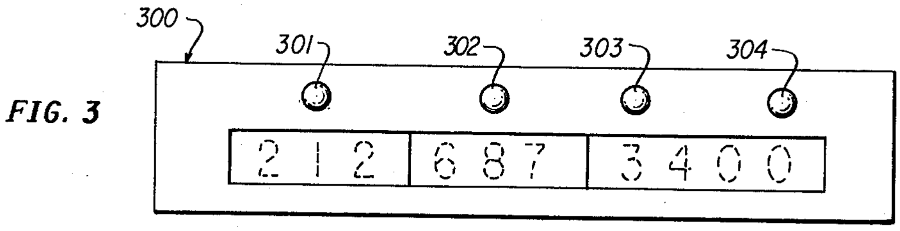
FIGURE 3 is a digit display panel for use in an operator switchboard position usable in a telephone system like that shown in FIGURE 1.

Before proceeding with the tracing of a call through the system, reference should be made to FIGURE 2 which shows the key and lamp equipment 200 for a PPCS switchboard position, and to FIGURE 3 which shows the layout of the digit display equipment 300 associated with a PPCS operator switchboard position. The purpose of this equipment located at operator position 115 is to provide the necessary controls for an operator who obtains information from the calling subscriber verbally, translates them to electrical signals by operation of keys and sends these signals to the ticketer 107. In the case of special instructions the operator uses a combination of written and electrical signals to record the particulars of the call. The switchboard 115 is conditioned for service by the accept key 210. If a call has been allotted to the position, a tone is transmitted to the operator when the ticketer 107 is connected, the ticketer 107 in turn connects stored data to the digit display equipment 300 for indication of the calling number, called number and ticketer number. The display lamps however are not lighted on the position until the operator requires the required numbers. The operator to request the calling number depresses key 211 and receives an indication of the number called on the call indicator panel 300 which would indicate a seven digit number on the display panel if the number is for a short haul toll call and a 10 digit number if the correct number required is on a long haul toll basis. The calling number indication is also noted by the lamp 303. If the operator wishes the called number she depresses the appropriate key 214 and receives the called number in digit display form on the digit display panel 300 with indicator lamp 302 being lit to indicate that a called number is being displayed. If the operator requires the number of the ticketer she depresses the ticketer display key 216, receives an indication on the calling display panel 300 of the ticketer number as well as an indication that a ticketer number is being supplied by the lighting of the lamp 301. In the positions as shown there is called and calling party supervision provided. Connection for the form of party supervision is established through key 218.

Six class keys are provided each with an adjacent lamp to indicate its operation and they are as follows: person-to-person paid key 221, person-to-person collect key 222, person-to-person special instructions key 223, station-to-station paid key 224, station-to-station collect key 225, station-to-station special instructions key 226 and their associated lamps 227, 228, 229, 230 and 231 and 232, respectively. One of these keys must be operated to indicate the class to the ticketer for billing purposes. Start key 233 is depressed when the operator wishes to start timing in the ticketer on the toll call which she has helped complete, lamp 234 indicates that this key has been depressed.

Also included are a digit hold key and associated lamp 235 and 236, respectively. The digit hold key may be operated to retain the information from a digit display after the ticketer has been released. To do this it is necessary for the operator to operate the digit hold key 235 before operating the release key 237 which releases the ticketer. A line release key 250 is provided to release the switching equipment if a call cannot be completed.

A lamp indication is given when a call is waiting for acceptance by the operator at call waiting lamp 238. If it becomes necessary to transfer the call from the PPCS switchboard 115 to a regular toll switchboard for handling on a delay basis or for some other reason the call transfer key 239 is operated. A key sender 240 is also included to permit the operator facilities for signaling out on the line.

When the PPCS position 115 is seized the operator receives a distinguishing tone and lamp indication as noted above, at which time the operator challenges the subscriber if the subscriber has not volunteered the necessary information. If the call is a person-to-person call the subscriber would need only say "Mr. Smith, please." The operator would then momentarily operate key (person-to-person paid) 221 and wait for answer supervision. When the called party who has been reached in the distant office over outgoing trunk 109, answers, the operator receives a lamp indication and proceeds to ask for Mr. Smith. When Mr. Smith is on the line the operator depresses the start key 233 to start timing. The operator may monitor the conversation for a moment to make certain that the proper party has been reached and then operates the release key 237 to disconnect the position from the call. Ticketing will be performed automatically by ticketer 107.

In the placement of a person-to-person call as illustrated above no record is required to be made of the call by the operator therefore no display from the calling or called numbers was actually required. If a charge to a third party call is made the operator can create a record of the calling number, called number and ticketer number if required.

The display unit 300 displays by digit display lights the called number, calling number and the ticketer number. Normally the display remains on as long as the operator has one of the display keys 211, 214, 216 operated and the ticketer 107 is in the connected position. Should there be need to hold the display after the ticketer is released a digit hold key 235 is supplied and the operator may operate this key before operating the release key 237 and the display will remain. However the position 115 is made busy until the display hold key is restored.

Should a placed call reach an all trunk busy condition or a wrong party the operator may release the selector 108 and outgoing trunk 109 by operating the key 250. This causes the ticketer 107 not to call for tabulator 120. The calling subscriber can either hang up and try again or ask the PPCS operator to try again later. In the latter case the PPCS operator could pass the call information to the regular toll operator over a key ended tie line between the two switchboards by operating call transfer key 239.

When the calling party at station 101 hangs up on a completed call the ticketer 107 calls for a tabulator 120 and spills forward its identity and other ticket information for record and billing purposes. The tabulator includes a register to record the class of call as keyed in by the operator for use in preparation of billing information.

For a more complete understanding of the system according to applicant's invention reference should be made to FIG. 4. This figure shows the manner in which a ticketer circuit like that shown in U.S. Patent 2,678,353, and in an operator's position like that shown in U.S. Patent 3,046,342 may be modified for use in a special service system in accordance with applicant's invention.

When the subscriber has dialed the necessary access code and accessed the selector as previously described, the timer control relay 2470 as indicated in the above mentioned patent operates closing ground at contacts 2475, through the link equipment 112, 114 and 116 and the position circuit 117 via lead TWL to the call waiting lamp 238 at the operator's position. Upon noticing the call waiting lamp the operator will operate key 210 placing ground on lead FT which is extended through the position and link circuits in a manner similar to that disclosed in U.S. Patent 3,046,342, through the ticketer equipment to the banks of the register resender finder 110. The code receiving switch 2610 contains in code form (2 or 3 markings out of 4) information as to the calling, called and ticketer numbers. This information is extended to the digit display unit 300. The digit display unit 300 may be any common type of visual indicator using "nixie lamps" or the like. The visual indicators are so wired as to function in response to the coded information received from the code receiver switch 2610.

If the operator wishes to note the calling number she will operate switch 211 extending ground to digit display unit 300 to display to the visual indicators a calling number. Similarly in like manner operation of key 214 will cause display of the called number and operation of key 216 will cause display of the ticketer number. If for some reason the operator wishes to hold any of the aforementioned numbers in the digit display unit operation of the hold key 235 will extend ground to the digit display unit 300 so that the numbers displayed there at the moment may be held after the display keys have been released.

After the display has been received by the operator, she will operate one of the appropriate class of service keys 221 through 226. These keys are strapped in a codel manner to place appropriate markings through the position equipment and the link equipment via the codel leads W, X, Y and Z through the ticketer to tabulator 120.

The information is then recorded in the tabulator 120 in the usual manner.

The operator may then initiate timing in the circuit upon operation of key 233 extending ground over lead DS through the position circuit 117, the link equipment 112, 114 and 116 to the tabulator to make contact 2343 which would be operated because of a closure of its associated relay during the seizure process of the ticketer 107. At this point the ground will be further extended to timing relay 2480 in the ticketer. If the operator desires to erase the time, operation of key 237 will remove ground from lead DE which is extended through the position and link circuits to the ticketer thus removing holding ground from relay 2410 extended through contacts 2413 causing it to release. Release of the timer circuitry by the operator's position may be accomplished in a manner similar to that shown in U.S. Patent 3,046,342 or in any other well known manner.

What is claimed is:

1. In a telephone system, a calling station identifiable by a directory number; a called station identifiable by a directory number; a register-sender including storage means for temporarily storing a plurality of variable items of record information pertaining to a telephone call including said called station directory number and said calling station directory number; a ticketer having a numerical designation; an operators position including display means connected to said ticketer and selectively operated to provide a visual indication of said numerical designation of said ticketer and said calling and called station directory numbers; said ticketer connected to said register-sender including means operated in response to said register-sender to extend a circuit from said calling station through said ticketer to said operators position; in said operator's position further including call acceptance means for completing said connection extended to said operator's position from said calling station by said ticketer; and said ticketer further including means operated in response to operation of said call acceptance means at said operators position to extend a call from said calling station to said called station, storage means operated in response to said register sender to store said calling and called station directory numbers, register means operated to record said calling and called station directory numbers, the class of service applicable to a call between said stations and to further record the duration of said call.

2. A telephone system as claimed in claim 1 wherein said operators position includes; signal means operated in response to the extension of a connection from said calling station to said operator's position by said ticketer to indicate the extension of said connection.

3. A telephone system as claimed in claim 2 wherein said signal means include visual signal means operated in response to the extension of a connection from said calling station to said operator's position by said ticketer to visually indicate the extension of said connection.

4. A telephone system as claimed in claim 1 wherein said operator's position includes; first key switch means for operating said display means to provide the numerical designation of said ticketer, second key switch means for operating said display means to provide a visual indication of the station directory number of the calling station and third key switch means for operating said display means to provide a visual indication of the station directory number of said called station.

5. A telephone system as claimed in claim 1 wherein said operator's position includes; class of service marking means connected to said ticketer for transmitting an indication of the class of service applicable to the connection between said calling station and said called station to operate said ticketer to record said class of service and extend the connection from said calling station to said called station.

6. A telephone system as claimed in claim 1 wherein said operator's position includes; timing start means connected to said ticketer for operating said ticketer to time the duration of a call between said called and calling stations.

7. A telephone system as claimed in claim 1 wherein said operator's position further includes; display hold means for retaining in said display means a visual indication of the numerical designation of said ticketer and the calling and called station directory numbers after disconnection of said ticketer from said display means.

References Cited in the file of this patent

UNITED STATES PATENTS

| | | |
|---|---|---|
| 2,041,084 | Myers | May 19, 1936 |
| 2,714,630 | Nilsson | Aug. 2, 1955 |
| 2,848,543 | Breed | Aug. 19, 1958 |
| 2,917,582 | Ostline et al. | Dec. 15, 1959 |

FOREIGN PATENTS

| | | |
|---|---|---|
| 711,506 | Great Britain | July 7, 1954 |